(12) United States Patent
Kenington

(10) Patent No.: US 8,311,166 B2
(45) Date of Patent: Nov. 13, 2012

(54) ACTIVE ANTENNA ARRAY AND METHOD FOR CALIBRATION OF THE ACTIVE ANTENNA ARRAY

(75) Inventor: Peter Kenington, Chepstow (GB)

(73) Assignee: Ubidyne, Inc., Wilmington, DE (US)

( * ) Notice: Subject to any disclaimer, the term of this patent is extended or adjusted under 35 U.S.C. 154(b) by 238 days.

(21) Appl. No.: 12/751,368

(22) Filed: Mar. 31, 2010

(65) Prior Publication Data

US 2011/0243285 A1    Oct. 6, 2011

(51) Int. Cl.
*H04L 1/02* (2006.01)
*H04B 7/10* (2006.01)

(52) U.S. Cl. ........ 375/347; 375/267; 375/299; 375/316; 370/334; 455/101

(58) Field of Classification Search .................. 375/267, 375/299, 316, 347; 455/101; 370/334
See application file for complete search history.

(56) References Cited

U.S. PATENT DOCUMENTS

| | | | |
|---|---|---|---|
| 6,480,153 B1 | 11/2002 | Jung et al. | |
| 6,693,588 B1 | 2/2004 | Schlee | |
| 7,102,569 B2 | 9/2006 | Tan et al. | |
| 7,106,249 B2 | 9/2006 | Kubo et al. | |
| 7,205,936 B2 | 4/2007 | Park et al. | |
| 7,292,877 B2 | 11/2007 | Yoon et al. | |
| 7,467,083 B2 * | 12/2008 | Kondo et al. | 704/223 |
| 8,009,095 B2 | 8/2011 | Schlee et al. | |
| 8,154,452 B2 | 4/2012 | Webb | |
| 8,184,606 B2 | 5/2012 | Bang et al. | |
| 2004/0063469 A1 | 4/2004 | Kuwahara et al. | |
| 2004/0088610 A1 | 5/2004 | Kobayakawa | |
| 2004/0142729 A1 | 7/2004 | Yuda et al. | |
| 2005/0140546 A1 | 6/2005 | Park et al. | |
| 2005/0220310 A1 * | 10/2005 | McGrath | 381/56 |
| 2006/0019712 A1 | 1/2006 | Choi | |
| 2006/0135111 A1 | 6/2006 | Jensen | |
| 2006/0141955 A1 | 6/2006 | Karjalainen et al. | |
| 2006/0183504 A1 | 8/2006 | Tanaka et al. | |
| 2009/0291632 A1 | 11/2009 | Braithwaite et al. | |

FOREIGN PATENT DOCUMENTS

| | | |
|---|---|---|
| EP | 938204 | 8/1999 |
| EP | 1085684 | 3/2001 |
| EP | 1178562 | 2/2002 |
| EP | 1187354 | 3/2002 |
| EP | 1615291 | 1/2006 |
| EP | 1329983 | 10/2006 |
| EP | 1585231 | 10/2009 |

(Continued)

OTHER PUBLICATIONS

International Search Report & Written Opinion issued in PCT/EP2011/054923 on Jun. 7, 2011.

(Continued)

*Primary Examiner* — Ted Wang
(74) *Attorney, Agent, or Firm* — Stephen H. Eland; Dann, Dorfman, Herrell & Skillman

(57) ABSTRACT

The disclosure relates to an active antenna array for a mobile communication system which comprises a plurality of receive paths, a sounding signal generator generating a sounding signal, and a coupler for coupling the sounding signal into at least one of a plurality of receive paths. A sounding signal extractor substantially removes the sounding signal from digitized ones of the receive signals to form a wanted signal. The disclosure also provides a method for the calibration of the receive path of the active antenna array.

13 Claims, 2 Drawing Sheets

FOREIGN PATENT DOCUMENTS

| | | |
|---|---|---|
| EP | 1608082 | 8/2010 |
| EP | 1906554 | 10/2010 |
| WO | 95/34103 | 12/1995 |
| WO | 03/028248 | 4/2003 |
| WO | 2009060598 | 5/2009 |

OTHER PUBLICATIONS

Extended European Search Report for EP Appl. No. 11160335.3 issued on Apr. 19, 2012.
Extended European Search Report issued in EP Appl. No. 11160336.1 on Sep. 6, 2012.

* cited by examiner

ACTIVE ANTENNA ARRAY AND METHOD FOR CALIBRATION OF THE ACTIVE ANTENNA ARRAY

CROSS REFERENCE TO OTHER APPLICATIONS

This application is related to U.S. patent application Ser. No. 12/751,391 entitled "ACTIVE ANTENNA ARRAY AND METHOD FOR CALIBRATION OF RECEIVE PATHS IN SAID ARRAY", filed Mar. 31, 2010 and U.S. patent application Ser. No. 12/751,342 entitled "ACTIVE ANTENNA ARRAY AND METHOD FOR CALIBRATION OF THE ACTIVE ANTENNA ARRAY", filed Mar. 31, 2010. The entire contents of the two concurrently filed applications are incorporated herein by reference.

FIELD OF THE INVENTION

The field of the invention relates to an active antenna array and a method for calibration of the active antenna array.

BACKGROUND OF THE INVENTION

The use of mobile communications networks has increased over the last decade. Operators of the mobile communications networks have increased the number of base stations in order to meet an increased demand for service by users of the mobile communications networks. The operators of the mobile communications network wish to reduce the running costs of the base station. One option to do this is to implement a radio system as an antenna-embedded radio forming an active antenna array. Many of the components of the antenna-embedded radio may be implemented on one or more chips.

Multiple receive paths in the antenna-embedded radio need to be synchronised in phase, delay and amplitude of signals travelling on the receive paths. Known techniques to establish variations in the phase, delay and amplitude of signals involve the injection of a known signal, termed the sounding signal, into one or more of the receive paths and, based on the comparison of the sounding signal and the received signal, the phase, delay and amplitude variations for the signals in the receive paths can be estimated. This allows for calibration of the receive paths by generation of correction coefficients to be applied to receive signals received along the multiple receive paths.

The sounding signal can have either the same frequency in a carrier signal spectrum or be at a different frequency than the carrier signal spectrum. In the first case (frequency of the sounding signal is in the carrier signal spectrum) then it is necessary to correctly adjust the power of the sounding signal. If the power of the sounding signal is too high, then the quality of the carrier signal can be degraded. On the other hand, if the power of the sounding signal is too low, the quality of the measurements of the phase, delay and amplitude variations is too low.

If the sounding signal is positioned in a frequency spectrum different from the carrier signal spectrum, then the frequency and phase response of the analogue receive filters in the receive paths can be slightly different at the different frequencies. This implies that the measurement results for the phase, delay and amplitude of the signals measured at the frequency of the sounding signal may be slightly different than the measurement results for the phase, delay and amplitude of the signals measured at the frequency of the carrier signal. In addition, it is necessary to ensure that the frequency of the sounding signal is different than any of the frequencies of the other carrier signals which might be measured at the antenna embedded radio. There is also a risk that blockers in the antenna embedded radio may block certain frequency bands and thus affect the quality of the error measurement. Finally the sounding signal might be unintentionally transmitted from a receive antenna and then be detectable at a receive port of another (unconnected) receiver, which might violate regulations.

A further known solution is to use a wide-band spectrum, for example a spread spectrum sounding signal, which is close to or below the noise floor of the carrier signals. In order to avoid the blockers, an extremely long sounding signal spreading code is necessary, in order to have sufficient processing gain.

SUMMARY OF THE INVENTION

An active antenna array is taught that comprises a plurality of receive paths carrying receive signals and a sounding signal generator for generating a sounding signal for sounding at least a portion of at least one of the plurality of receive paths. A coupler is used for coupling the sounding signal into at least one of the plurality of receive paths and a sounding signal extractor is used for substantially removing the sounding signal from digitised ones of the receive signals, to form a wanted signal. This allows the analysis of the sounding signal to take place after passage through the receive paths, to calculate correction coefficients, without it affecting the receive signal quality of the wanted received signals.

In one aspect of the invention the active antenna array further comprises a power controller for controlling the level of power of the sounding signal. This allows control of the power to avoid the "swamping" of a carrier signal.

The disclosure also teaches a method for the calibration of a receive path of an active antenna array which comprises generating an initial sounding signal, coupling the initial sounding signal into at least one of a plurality of the receive paths to generate an adjusted sounding signal, and comparing the adjusted sounding signal with the initial sounding signal for generating calibration parameters.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that a feature or features of one aspect or embodiment of the invention can be combined with a feature or features of a different aspect or aspects and/or embodiments of the invention.

Figure 1:
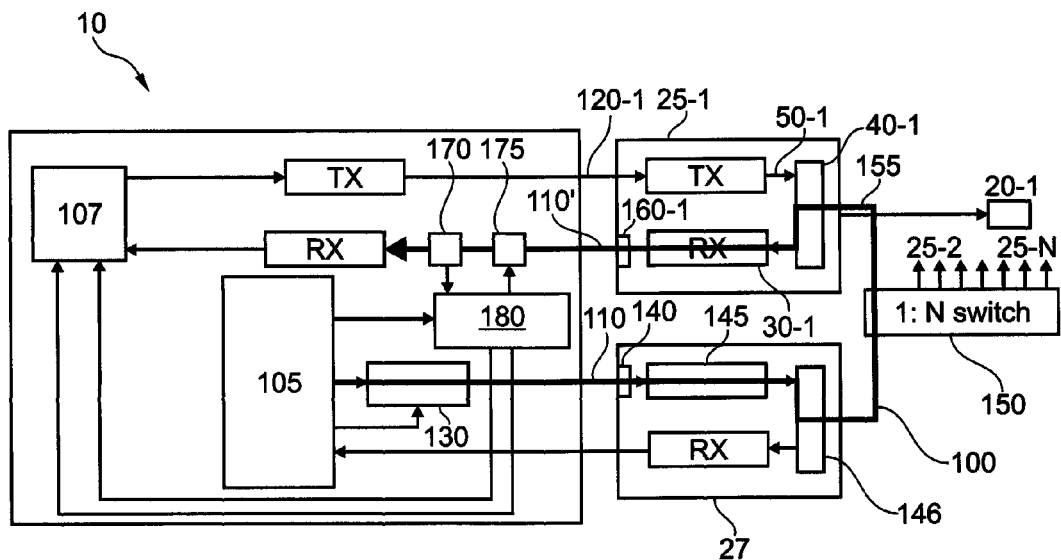
FIG. 1 shows an example of an active antenna array using the system for the calibration of a single signal receive path.

FIG. 1 shows an example of an aspect of the invention, in this instance for the calibration of a single receive path 30-1 in an active antenna array 10 by the generation of correction coefficients. The active antenna array 10 has a plurality of antenna elements 20 (only one 20-1 of which is shown in FIG. 1) which are connected to a plurality of transceivers 25. In the aspect shown in FIG. 1 only one of the transceivers 25 is shown and is labelled as 25-1. It will be appreciated that the teachings of this disclosure are relevant for an active antenna array 10 with any number of transceivers 25. Typically there will be eight or sixteen transceivers 25.

The transceiver 25-1 has a receive path 30-1 and a transmission path 50-1. Both the receive path 30-1 and the transmission path 50-1 are connected to the antenna element 20-1 through a duplex switch 40-1. The function of the duplex switch 40-1 is to switch the antenna element 20-1 between transmit signals being transmitted on the transmission path 50-1 and signals being received from the antenna element 20-1 and passed to the receive path 30-1.

The active antenna array 10 has a digital signal processor 100. The digital signal processor 100 is used to produce the signals for transmission on the antenna elements 20 and to process the radio signals received from the antenna element 20. A beamforming block 107 in the digital signal processor 100 will use the correction coefficients calculated as described later in this disclosure in order to account for phase, delay and amplitude variations on the receive signals received on the receive path 30-1. This function has been described in co-pending applications of Ubidyne and will be not discussed here in detail.

The active antenna array 10 has further a control unit 105 whose function is to produce a sounding signal 110. The sounding signal 110 may take different forms. For example the sounding signal may be a broad-based signal covering all frequency bands in the spectrum of interest of the carrier signal. The sounding signal may also be a signal which is inserted between the frequencies of interest in the spectrum of the carrier signal. The control unit 105 is connected to a power controller 130. The power controller 130 is connected to an auxiliary transceiver 27. The auxiliary transceiver 27 is, however, used for the transmission of the sounding signal 110 as will be explained below. The sounding signal 110 is received from the power controller 130 and is converted by a digital-to-analogue converter (DAC) 140 from the digital domain to an analogue signal and is passed along an auxiliary transmission path 145 to an output 146 and then to a multi-way switch 150. It will be noted at this stage that the auxiliary transceiver 27 also includes a receive path, but this receive path is not used in this aspect of the invention.

The multi-way switch 150 accepts the sounding signal 110 as an input and switches the sounding signal 110 to one of the plurality of the transceivers 25-1, 25-2, . . . , 25-N. In the aspect depicted in FIG. 1 the sounding signal 110 is passed through a coupler 155 to the duplex switch 40-1 of the first one 25-1 of the transceivers 25.

It will be noted that the multi-way switch 150 has a number of other outputs which are labelled in FIG. 1 as being passed to other ones of the plurality of the transceivers 25-2, . . . , 25-N.

In the first transceiver 25-1 the sounding signal 110 is passed to the receive path 30-1 and then to an analogue-to-digital convertor 160-1 to produce a sounding signal 110' in the digital domain. The receive path 30-1 will also carry a receive signal 120-1 from the antenna element 20-1 which is also converted to a digital signal in the analogue-to-digital convertor 160-1. The sounding signal 110' and the receive signal 120-1 (now in the digital domain) is passed further to the digital signal processor 100 for processing and to a calibration processing unit 180 via a coupler 170. The digital signal processor 100 can carry out beam forming operations on the receive signal 120-1 and can also apply the correction coefficients as calculated below.

The calibration processing unit 180 receives the sounding signal 110' after the sounding signal 110 has passed through the transceiver 25-1, the digital-to-analogue convertor 140 and the analogue-to-digital convertor 160-1 as well as the transmission path 145 in the auxiliary transceiver 27. The calibration processing unit 180 is able to compare this sounding signal 110' with the originally injected sounding signal 110 received prior to the conversion to an analogue signal by the digital-to-analogue convertor 140. The calibration unit 180 is therefore able to calculate the correction calibration coefficients that need to be supplied to the digital signal processor 100 in order to correct the beam forming vectors due to the passage of the receive signal 120-1 through the receive paths 30-1.

The calibration processing unit 180 is also able to substantially remove the sounding signal 110' from the receive path 30-1. This is done by subtracting a signal substantially similar to the sounding signal 110' using a subtractor 175.

The power controller 130 compares the power of the sounding signal 110' after the sounding signal 110' has it is passed through circuitry in the radio head 25-1 with the power of the receive signal 120-1 in order to ensure that the energy in the sounding signal 110' is not so large as to interfere with the receive signal 120-1 in the receive path 30-1. The power of the initially injected sounding signal 110 can be adjusted by the power controller 130 in order to ensure that this interference is limited.

It will be appreciated that the receive path 30-1 can take many different forms. For example there may be direct conversion of the analogue receive signal from the antenna element 20-1 into a digital signal for passage to the digital signal processor 100. There may be alternatively a single-stage or a multi-stage down conversion of the analogue receive signal and/or there may be a delta-sigma based analogue-to-digital conversion of the analogue receive signal. It will be appreciated that the precise design of the receive path 30-1 has no bearing on the ideas disclosed in this disclosure.

Figure 2:
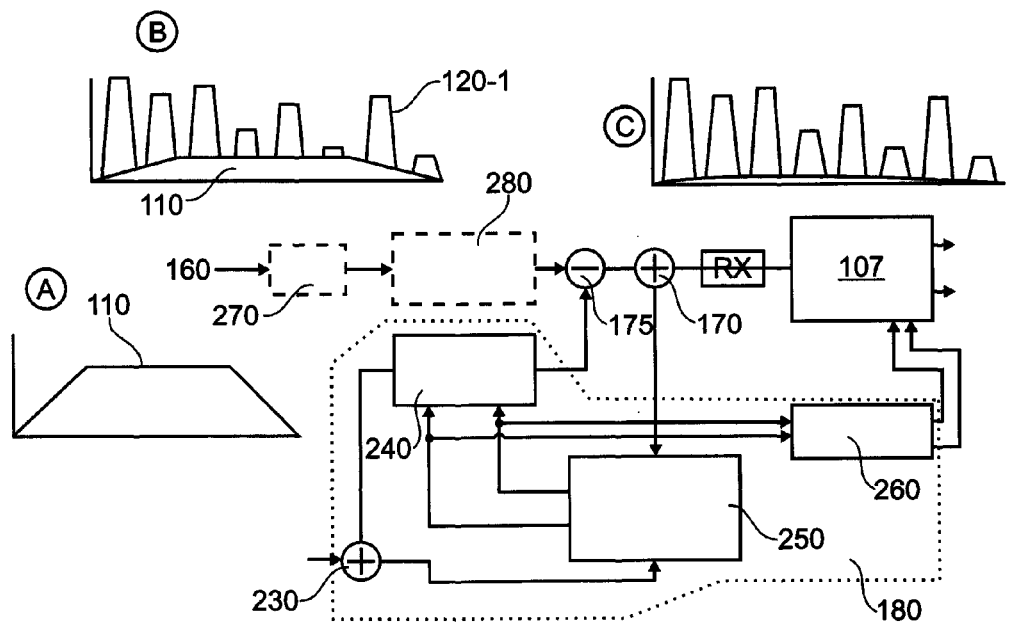
FIG. 2 shows a view of part of the circuit of the example of FIG. 1.

FIG. 2 shows an aspect of the calibration processing unit 180 as might be used in the circuit of FIG. 1. It will be seen that the sounding signal 110 in FIG. 2 is a broad spectrum sounding pilot signal (see insert A) which is transmitted from a sounding signal generation unit in the control unit 105. The sounding signal 110 is passed to the digital-to-analogue convertor 140 (not shown on FIG. 2, but shown in FIG. 1) and also to the calibration unit 180. The sounding signal 110 is passed through a splitter 230 to a first gain/phase controller or vector modulator 240 and to a correlator and control system 250. The output of the first gain/phase controller or vector modulator 240 is passed to the subtracter 175.

The correlator and control system 250 also receives an input from the coupler 170. In addition, a calibration coefficient processing unit 260 is present and passes correction coefficients to the beamforming block 107 where the correction coefficients may be used to correct the receive signals 25-1, as discussed above.

Insert B shows the combination of the receive signals 25-1 and the sounding signal 110 which have been converted from the analogue domain to the digital domain in the analogue-to-digital convertor 160. It will be seen in this insert B that the power of the sounding signal 110 is substantially lower than the power of the receive signals 120-1 received by the antenna element 20-1.

An adaptive filter 270 and a second gain/phase controller or vector modulator 280 are shown in the receive path 30-1 between the analogue-to-digital convertor 160 and the subtracter 175 in this FIG. 2. The adaptive filters 270 and the second gain/phase controller or vector modulator 280 are optional elements and may not be present in all implementations. The second gain/phase controller or vector modulator 280 may be used in place of the first gain/phase controller or vector modulator 240 without loss of functionality (in which case, the first gain/phase controller or vector modulator 240 could be omitted and replaced with a straight-through connection). In this case, the second gain/phase controller or vector modulator 280 would receive its control signals from the correlator and control system 250 in the same manner as is shown for the first gain/phase controller or vector modulator 240, in FIG. 2.

The receive path 25-1 includes the subtractor 175 and the coupler 170. An input of the subtractor 175 is connected to the output of the calibration processing unit 180, and more particularly to an output of the first gain/phase controller or vector modulator 240. The subtractor 175 is used to subtract the sounding signal 110' from the receive path 25-1 such that the sounding signal 110' is substantially removed from the signal, as is shown in the insert C, to leave substantially the receive signal 120-1. The coupler 170 passes part of the signal to the calibration processing unit 180, and more particularly to the correlator and control system 250 which calculates the values that need to be supplied to the subtractor 175 in order to substantially subtract the sounding signal 110 from the signal. The correlator and control system receives the sounding signal form the splitter 230.

The output of the coupler 170 is substantially the receive signal 120-1 shown in the insert C which is then passed to the beam forming block 107 or further processing.

The output of the first correlator and control system 250 is also passed to the calibration coefficient processing unit 260 which is able to calculate the correction coefficients to be used to take into account any delays, phase changes or amplitude variations of the receive signal 120-1 passing through the receive path 30-1.

Figure 3:
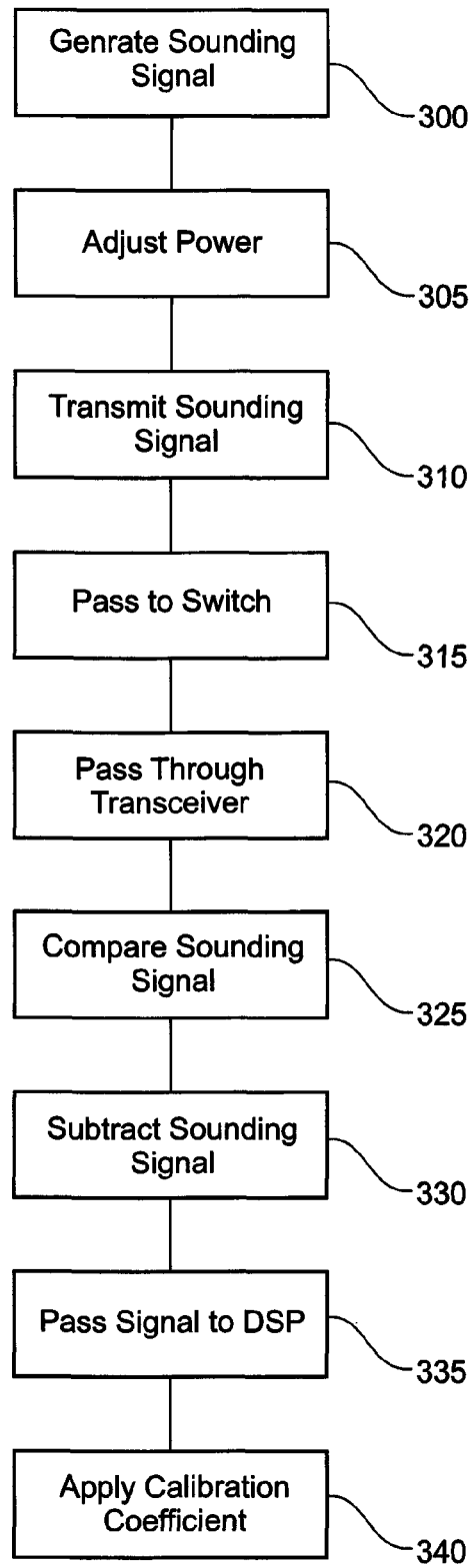
FIG. 3 shows an overview of the method used for the calibration of the single receive path.

FIG. 3 shows a method used for the measurement and calculation of the correction values for the phase, delay and amplitude of the receive signals 120-1 received by the antenna element 20-1 and passed along the receive path 25-1.

In a first step 300 the sounding signal 110 is generated in the control unit 105. The power of the sounding signal 110 is adjusted in step 305 by the power controller 130 which, as explained above, compares the power of the sounding signal 110 with the receive signal 120-1 in the receive path 30-1. In step 315 the sounding signal 110 is passed through the transceiver 27 to the switch 150. The switch 150 switches the sounding signal 110 into one of the plurality of receive paths 30. In the example shown in FIG. 1 and described in connection with FIG. 3 the sounding signal 110 is switched to a first one of the receive paths 30-1 and coupled with the receive signal 120-1 in the coupler 155 before the sounding signal 110' (with the receive signal 120-1) is passed through the transceiver 25-1. The sounding signal 110 and the receive signal 120-1 are converted from the analogue domain to the digital domain in the analogue-to-digital convertor 160.

In step 325 the converted sounding signal 110' is compared in the calibration processing unit 180 with the original sounding signal 110 and the correction coefficients are calculated which can be passed to the digital signal processor 100, as described above. The sounding signal 110 is subtracted from the receive signal 120-1 in step 330 and the receive signal 120-1 is passed in step 335 to the digital signal processor 100.

The correction coefficients are applied to the receive signal 120-1 in step 340, as well as a beam forming or other coefficients, as required.

It will be noted that the calculation of the correction coefficients should be carried out in a carrier-based manner because there could be differences in the power of the receive signals 120 from two different ones of the carrier signals. Therefore the power controller 130 should measure the power of the required carrier signal, i.e. at the carrier signal frequency. It will, of course, be noted that should more than one carrier's receive signals 120 be received by the antenna element 20 it could be possible to include more than one power controller 130 in order to measure the power of the carrier signals of the different carriers at different frequencies. The inclusion of more than one power controller 130 enables the calculation of the correction coefficients to be carried out for more than one carrier signal at the same time. This minimises the impact of the time required for the calculation of the correction coefficients for the received carrier signals.

It will be appreciated that in the event that the power of the received carrier signals is significantly changed during the calculation of the correction coefficients then the measurement may be corrupted. It would be possible for a trigger to be placed within, for example the control unit 105, that triggers the calculation procedure only when there is a low probability of a significant change in the power of the received carrier signal.

In further refinements of this disclosure it will be appreciated that the sounding signal, its timing and its power can be selected such that any distortions due to the sounding signal in the receive signal are minimised. For example, when calibrating GSM signals it would be possible to choose a certain time slot for the calculation procedure. Similarly for the calculation of correction coefficients for LTE receive signals a certain specified time and frequency slot should be used. A spreading code that is not in use and is not intended to be used could be used for the generation of the sounding signal and the calculation of correction coefficients for WCDMA signals. Similarly a certain time slot and spreading code could be used for the generation of the sounding signal and the calculation of correction coefficients for TD-SCDMA signals. Of course, the skilled person will understand that with other types of radio signals there are opportunities for selecting the correct timing and power of the sounding signal as well as its structure.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known computer useable medium such as semiconductor, magnetic disc, or optical disc (e.g., CD-ROM, DVD-ROM, etc.). The software can also be disposed as a computer data signal embodied in a computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method described herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

Reference Numeral
10 Active antenna array
20 Antenna elements
25 Transceiver
30 Receive path
40 Duplex switch
50 Transmission path
100 Digital signal processor
105 Control unit
110 Sounding signal
120 Receive signal
130 Power controller
140 DAC
145 Transmission path
146 Output path
155 Coupler
160 ADC
170 Coupler
175 Subtractor
180 Calibration processing unit
230 Splitter
240 First gain/phase controller
250 Correlator and control system
260 A calibration coefficient unit
270 Adaptive filter
280 Second gain/phase controller

The invention claimed is:

1. An active antenna array for mobile communications network comprising:
   a plurality of receive paths carrying receive signals;
   a sounding signal generator for generating a sounding signal for sounding at least a portion of at least one of the plurality of receive paths;
   a coupler for coupling the sounding signal into at least one of the plurality of receive paths;
   a sounding signal extractor for substantially removing the sounding signal from digitised ones of the receive signals to form a wanted signal.

2. The active antenna array of claim 1, further comprising a power controller for controlling the level of power of the sounding signal.

3. The active antenna array of claim 1, further comprising a controller for adjusting the characteristics of the sounding signal.

4. The active antenna array of claim 1, further comprising a controller for adjusting the characteristics of the digitised receive signals.

5. The active antenna array of claim 1, further comprising a correlator for correlating, in the digital domain, the sounding signal with at least one of the plurality of digitised receive signals, to form an error signal.

6. The active antenna array of claim 1, further comprising a controller for adjusting characteristics of one of the plurality of digitised receive signals and the coupled sounding signal, in order to substantially eliminate the sounding signal in the one of the plurality of digitised receive signals, following subtraction of the sounding signal.

7. The active antenna array of claim 6, further comprising a correlator for correlating, in the digital domain, the sounding signal with at least one of the plurality of digitised receive signals, to form an error signal, whereby the controller is adapted to adjust the characteristics in response to the error signal.

8. The active antenna array of claim 7, whereby the controller is adapted to adjust the characteristics in response to one of in-phase and quadrature (I, Q) characteristics of the error signal or magnitude and phase characteristics of the error signal.

9. The active antenna array of claim 1, further comprising a controller for adjusting characteristics of the sounding signal, in order to substantially eliminate the sounding signal in the one of the plurality of digitised receive signals, following subtraction of the sounding signal.

10. The active antenna array of claim 9, further comprising a correlator for correlating, in the digital domain, the sounding signal with at least one of the plurality of digitised receive signals, to form an error signal, whereby the controller is adapted to adjust the characteristics of the sounding signal in response to the error signal.

11. The active antenna array of claim 10, whereby the controller is adapted to adjust the characteristics in response to one of in-phase and quadrature (I, Q) characteristics of the error signal or magnitude and phase characteristics of the error signal.

12. The active antenna array of claim 1, further comprising a calibration coefficient generator.

13. A computer program product comprising a non-transitory computer usable medium having control logic stored therein for causing a computer to manufacture an active antenna array comprising:
   a plurality of receive paths carrying receive signals;
   a sounding signal generator for generating a sounding signal for sounding at least a portion of at least one of the plurality of receive paths;
   a coupler for coupling the sounding signal into at least one of the plurality of receive paths;
   a sounding signal extractor for substantially removing the sounding signal from digitised ones of the receive signals to form a wanted signal.

* * * * *